United States Patent
Wang et al.

(10) Patent No.: US 9,301,028 B2
(45) Date of Patent: Mar. 29, 2016

(54) METHOD AND SYSTEM FOR IMPLEMENTING ALTERNATE ROUTES IN OPTICAL TRANSMISSION NETWORK OF WAVELENGTH SWITCHED OPTICAL NETWORK (WSON)

(75) Inventors: Zhenyu Wang, Shenzhen (CN); Dajiang Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 58 days.

(21) Appl. No.: 13/257,966

(22) PCT Filed: Sep. 2, 2009

(86) PCT No.: PCT/CN2009/073692
§ 371 (c)(1),
(2), (4) Date: Nov. 8, 2011

(87) PCT Pub. No.: WO2010/130114
PCT Pub. Date: Nov. 18, 2010

(65) Prior Publication Data
US 2012/0057868 A1 Mar. 8, 2012

(30) Foreign Application Priority Data
May 11, 2009 (CN) .......................... 2009 1 0107255

(51) Int. Cl.
*H04J 14/00* (2006.01)
*H04L 1/00* (2006.01)
(Continued)

(52) U.S. Cl.
CPC ........ *H04Q 11/0062* (2013.01); *H04J 14/0268* (2013.01); *H04J 14/0284* (2013.01); *H04L 45/22* (2013.01); *H04L 45/62* (2013.01); *H04Q 2011/0081* (2013.01)

(58) Field of Classification Search
None
See application file for complete search history.

(56) References Cited

U.S. PATENT DOCUMENTS 7,120,118 B2 * 10/2006 Rajagopal ........... H04L 12/2602
370/216
7,535,826 B1 * 5/2009 Cole ....................... H04L 45/00
370/218

(Continued)

FOREIGN PATENT DOCUMENTS

CN 1710868 A * 12/2005

OTHER PUBLICATIONS

Sebos et al., Effectiveness of Shared Risk Link Group Auto-Discovery in Optical Networks, 2000, Optical Society of America.*
(Continued)

*Primary Examiner* — Li Liu
*Assistant Examiner* — Jai Lee
(74) *Attorney, Agent, or Firm* — Ling Wu; Stephen Yang; Ling and Yang Intellectual Property

(57) ABSTRACT

The present invention discloses a method and a system for implementing alternative routes in optical transmission network of WSON. By using the method and the system the following alternative routes implementing process is realized: computing the alternative routes of each subsegment independently based on a constraining condition distributed by a managing plane, and combining the computed alternative routes of each subsegment to form complete alternative routes. The present method and system for implementing alternative routes is capable of obtaining more alternative routes than those of prior art, and takes full advantage of network resource topology.

6 Claims, 4 Drawing Sheets

(51) Int. Cl.
*H04Q 11/00* (2006.01)
*H04J 14/02* (2006.01)
*H04L 12/707* (2013.01)
*H04L 12/721* (2013.01)

(56) References Cited

U.S. PATENT DOCUMENTS

2005/0073958 A1* 4/2005 Atlas ................ H04L 45/00 370/238
2008/0225723 A1* 9/2008 Lee .................... H04J 14/0271 370/235
2009/0182894 A1* 7/2009 Vasseur ............... H04L 45/02 709/239
2009/0225650 A1* 9/2009 Vasseur ............... H04L 41/0668 370/218
2009/0296719 A1* 12/2009 Maier .................. H04L 45/12 370/400

OTHER PUBLICATIONS

International Search Report for PCT/CN2009/073692 dated Jan. 28, 2010.
Wang D, Wang Z, Q Xiang, F Gao, ZTE Corporation: "PCECP Requirements and Extensions of Alternate Routing for Wavelength Switched Optical Networks"; draft-wang-pce-wson-alternate-routing-00.txt, Oct. 28, 2008.

* cited by examiner

METHOD AND SYSTEM FOR IMPLEMENTING ALTERNATE ROUTES IN OPTICAL TRANSMISSION NETWORK OF WAVELENGTH SWITCHED OPTICAL NETWORK (WSON)

TECHNICAL FIELD

The present invention relates to optical communication field, and in particular, to a method and a system for implementing alternative routes of SPC service in optical transmission network of WSON under network resource constraining conditions.

BACKGROUND OF THE RELATED ART

In the optical transmission network of WSON (Wavelength Switched Optical Network), which is also called WDM ASON (Wavelength-Division Multi-plexing Automatically Switched Optical Network), it is required to design appropriate RWA (Routing and Wavelength Assignment) implementation scheme to realize SPC (Soft Permanent Connection). Due to the nondeterministic polynomial characteristics of RWA, the route R process and wavelength allocation WA process included in RWA are to be implemented in two steps. The WA wavelength allocation process of the current WSON transmission network is not fully wavelength switched generally; due to the confine imposed by the limitation of block crossing on transmission node, multiple alternative routes should be provided in the computing process of R routing so as to provide an alternative route and to proceed a new WA wavelength allocating process after a failure in WA analysis on a selected route. In RFC4655 and RFC4657, the functions and architectures of PCE (Path Computation Element) as the path computing unit of GMPLS (Generalized Multiprotocol Label Switching) are described emphatically, and the alternative routing is the very function that PCE needs to possess under block crossing conditions.

Generally, route computing should satisfy constraining conditions distributed by a managing plane, wherein the constraining conditions generally comprise: must-be-avoided nodes, links, SRLG (Shared Risk Link Group), and must-be-passed-through nodes, links, SRLG. Accordingly, it is required that the K lines of alternative routes provided by the ASON control plane must fully satisfy the constraining conditions on route computing that are distributed by the managing plane. Furthermore, when the control plane computes the route under the must-be-passed-through constraining conditions, the computing is generally implemented in a way of segment-wise computing, i.e., to divide an entire route to be computed sequentially from the SPC source node to the destination node into several subsegments based on the nodes, links and SRLG that must be passed through, as shown in FIG. 1. When computing the alternative routes of each subsegment, the conventional practice is to shield all the network resource topology that has been passed through by all the computed alternative routes of all the subsegments (except the source node and the destination node of the subsegment), i.e., to take all the nodes, links and SRLGs that have been passed through by all the alternative routes of all the subsegment as must-be-avoided constraining conditions and also to take the must-be-passed-through nodes, links and SRLGs other than the subsegment as the must-be-avoided constraining conditions of the route computing of the subsegment. The result of that is that because the must-be-avoided network resources become increasingly more, the number of alternative routes computed for the subsequent subsegment to be computed becomes increasingly less.

SUMMARY OF THE INVENTION

The technical problem to be solved by the present invention is to overcome the shortcomings of the prior art, and to provide a method and a system for implementing alternative routes in optical transmission network of WSON, so as to increase the utilization ratio of the network resource topology in optical transmission network in route computing.

The technical problem of the present invention is solved by the following technical scheme.

A method for implementing alternative routes in optical transmission network of WSON comprises alternative route computing process under constraining conditions, said computing process comprising a step of computing the alternative routes of each subsegment independently based on a constraining condition distributed by a managing plane.

The method further comprises a step of combining the computed alternative routes of each subsegment to form complete alternative routes.

The step of combining the computed alternative routes of each subsegment to form complete alternative routes further comprises a process of screening the computed alternative routes of each subsegment so that no repetitive node and no repetitive link exist within any one of the complete alternative routes.

The constraining condition comprises must-be-passed-through network resources and must-be-avoided network resources.

The must-be-passed-through network resources comprise must-be-passed-through nodes, must-be-passed-through links and must-be-passed-through shared risk link groups; said must-be-avoided network resources comprise must-be-avoided nodes, must-be-avoided links and must-be-avoided shared risk link groups.

The method further comprises, before computing the alternative routes of each subsegment, a step of division to form the subsegments based on said must-be-passed-through network resources.

The computing process of the alternative routes of each subsegment takes the source nodes and the destination nodes of the other subsegments as must-be-avoided nodes.

A system for implementing alternative routes in optical transmission network of WSON comprises an alternative route computing engine for computing alternative routes under constraining conditions, said alternative route computing engine comprising a subsegment computing module for computing the alternative routes of each subsegment independently based on a constraining condition distributed by a managing plane.

The alternative route computing engine further comprises a combining module for combining the computed alternative routes of each subsegment to form complete alternative routes.

The combining module is also used to screen alternative routes so that no repetitive node and no repetitive link exist within any one of the complete alternative routes.

The alternative route computing engine is also used to, before computing alternative routes of each subsegment, perform division to form the subsegments based on the must-be-passed-through network resources.

The subsegment computing module is also used to take in the computing process of alternative routes of each subsegment the source nodes and the destination nodes of the other subsegments as must-be-avoided nodes.

The beneficial effects of the present invention over the prior art are that:

(1) when computing the alternative routes of each subsegment, the present invention satisfies the constraining conditions distributed by the managing plane and in case of multiple subsegments avoids the source nodes and the destination nodes of other subsegments, but does not take any other network resource as the must-be-avoided constraining conditions, which leads to obtaining of more alternative routes and more sufficient utilization of network resource topology than the implementing mode of the prior art approaches, which perform isolation between sections and take the nodes that have been passed through by the other subsegments as the must-be-avoided constraining conditions;

(2) In the present invention, the computed routes of each subsegment are screened and combined, thereby obtaining complete alternative routes, so that no repetitive node and no repetitive link exist within any one of the complete alternative routes.

PREFERRED EMBODIMENTS OF THE PRESENT INVENTION

The present invention will be further described in detail with reference to specific embodiments in conjunction with accompanying figures.

Figure 1:
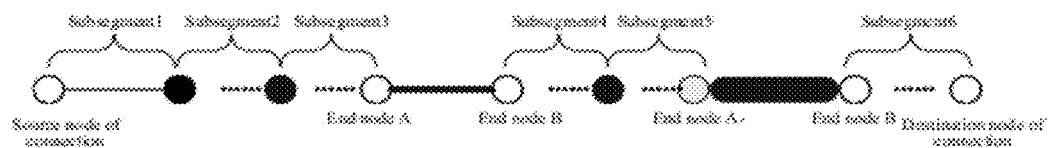
FIG. 1 is the schematic graph of the route subsegment dividing under must-be-passed-through resource constraining conditions in a specific embodiment of the method of the present invention.

FIG. 1 is an example of must-be-passed-through resource network constraining conditions, wherein the solid round dots are must-be-passed-through nodes, the deep color thin solid lines are must-be-passed-through links, the deep color heavy solid lines are must-be-passed-through SRLGs, the hollow round dots are unconstrained nodes, the light color thin solid lines are unconstrained links, the light color heavy solid lines are unconstrained SRLGs, and the dotted lines are omitted unconstrained node sequences. The head node is to must-be-passed-through node 1 (or the end node A of must-be-passed-through link 1, SRLG 1), the must-be-passed-through node 1 (or the end node B of must-be-passed-through link 1, SRLG 1) is to must-be-passed-through node 2 (or the end node A of must-be-passed-through link 2, SRLG 2), . . . , and the must-be-passed-through node n (or the end node B of must-be-passed-through link n, SRLG n) is to the destination node. Except the two subsegments at the head and at the tail, the source node and the destination node of each subsegment are the sequentially must-be-passed-through nodes, or the end nodes of must-be-passed-through links, SRLGs. All of the must-be-passed-through constraints involved in the present invention refer to the constraints of strictly sequentially passing through the designated nodes, links and SRLGs.

Figure 2:
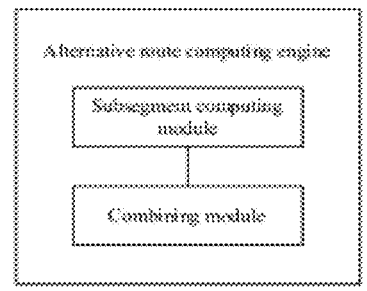
FIG. 2 is the structural schematic of a specific embodiment of the system of the present invention.

One embodiment of the system for implementing alternative routes in optical transmission network of WSON of the present invention, as shown in FIG. 2, comprises an alternative route computing engine for computing alternative routes under constraining conditions.

The alternative route computing engine also performs subsegment dividing based on a constraining condition, and further comprises a subsegment computing module and a combining module. The subsegment computing module is used to compute alternative routes of each subsegment independently based on a must-be-passed-through constraining condition distributed by managing plane, i.e., the intermediate nodes that have been passed through by the alternative routes of the other subsegments are no longer taken as constraining conditions. The combining module is used to screen the computed alternative routes of each subsegment and combine the screened computed alternative routes of each subsegment to form complete alternative routes so that no repetitive node and no repetitive link exist within any one of the complete alternative routes. The constraining condition distributed by the managing plane comprises must-be-passed-through network resources and must-be-avoided network resources. The must-be-passed-through network resources comprise must-be-passed-through nodes, must-be-passed-through links and must-be-passed-through shared risk link groups, and the must-be-avoided network resources comprise must-be-avoided nodes, must-be-avoided links and must-be-avoided shared risk link groups. The subsegment computing module takes in the computing process of alternative routes of each subsegment the source nodes and the destination nodes of the other subsegments as must-be-avoided network nodes to compute the alternative routes.

In the method for implementing alternative routes in optical transmission network of WSON of the present invention, under the constraining condition that multiple intermediate nodes must be passed through sequentially to perform the computing of K lines of constrained alternative routes, the managing plane requires that the obtained K lines of alternative routes successively pass through the source node, node 1, node 2, node 3, . . . , node N and the destination node. In route computing, firstly subsegment dividing is performed based on the must-be-passed-through network resources, one embodiment of which is to divide the route to be queried into subsegments of source node→node 1, node 1→node 2, node 2→node 3, . . . , node N→destination node, and to successively compute the K' lines of the subroutes of each subsegment. In the route computing of each subsegment, each subsegment takes only the must-be-passed-through nodes other than the head node and the tail node of the subsegment as well as the source node and the destination node that the subsegment connects to as the must-be-avoided constraining conditions, and does not take the intermediate nodes that have been passed through by the routes of the subsegments previously obtained as a must-be-avoided constraining condition. The finally obtained routes of each subsegment are screened and combined, so that the same node or the same link is not repetitively passed through within the combined route, thereby obtaining K lines of complete alternative routes. The examples and the comparative examples are as follows:

EXAMPLE 1

Figure 3:
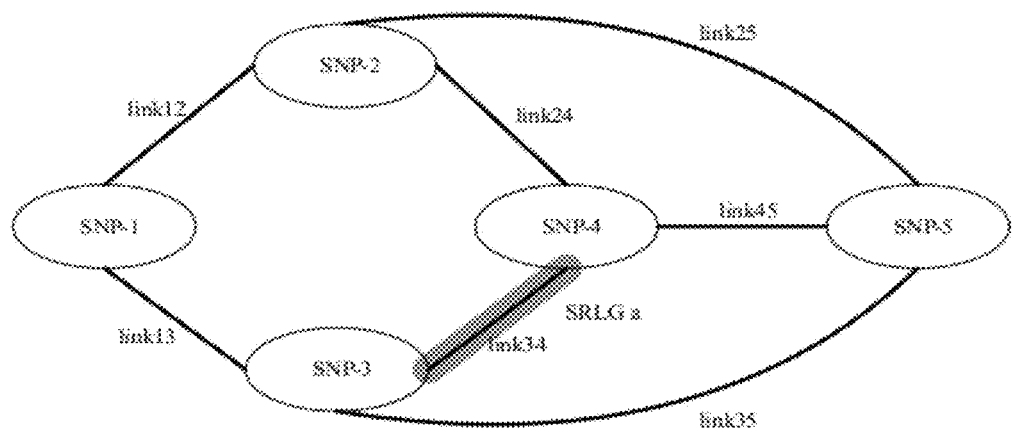
FIG. 3 is the schematic graph of the transmission network topology under the must-be-passed-through node SNP-4 constraint of Example 1.

FIG. 3 shows a graph of a transmission network topology, wherein the thin solid lines are SNP links, the heavy solid lines is an SRLG, the transmission network topology consists of five nodes of SNP-1, SNP-2, SNP-3, SNP-4 and SNP-5, and all the links between the nodes (such as link24, link12) are two-way links. The link34 between the nodes SNP-3 and SNP-4 is SRLG a. The managing plane distributes a route enquiry request to require computing the K lines of routes that are from the node SNP-1 to the node SNP-5 and must pass through the node SNP-4. The final routes are ordered according to a certain strategy, which in this example is the ordering strategy with the minimal total link cost, and other strategies may be utilized.

Figure 4:
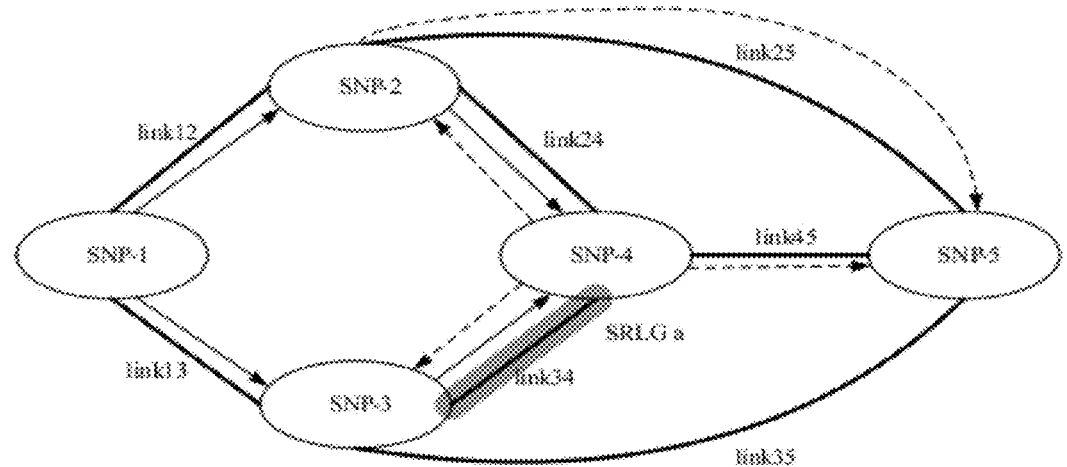
FIG. 4 is the schematic graph of the alternative routes computed by the method of the present invention under the must-be-passed-through node SNP-4 constraint.

Following are the steps to implement the alternative routes:
firstly, with avoiding the destination node SNP-5 as the constraining condition, computing the subroutes from the source node SNP-1 to the node SNP-4 and obtaining two lines of subroutes SNP-1→SNP-2→SNP-4 and SNP-1→SNP-3→SNP-4, as shown by the solid arrow in FIG. 4; then, with avoiding the head node SNP-1 as the constraining condition, computing the subroutes from SNP-4 to SNP-5, when the intermediate nodes that have been passed through form the node SNP-1 to the node SNP-4 are no longer taken as the must-be-avoided constraining conditions in this route computing, and obtaining three lines SNP-4→SNP-5, SNP-4→SNP-2→SNP-5 and SNP-4→SNP-3→SNP-5, as shown by the dotted arrow in FIG. 4; finally, combining the two sections of the subsegment routes, and obtaining 4 lines of routes that are from the source node SNP-1 to the destination node SNP-5 and must pass through the node SNP-4, as shown in FIG. 4, wherein the thin solid lines are SNP links and the heavy solid lines are SRLGs, i.e.:
    A1. SNP-1→SNP-2→SNP-4→SNP-5;
    A2. SNP-1→SNP-3→SNP-4→SNP-5;
    A3. SNP-1→SNP-3→SNP-4→SNP-2→SNP-5;
    A4. SNP-1→SNP-2→SNP-4→SNP-3→SNP-5.

COMPARATIVE EXAMPLE 1

Figure 5:
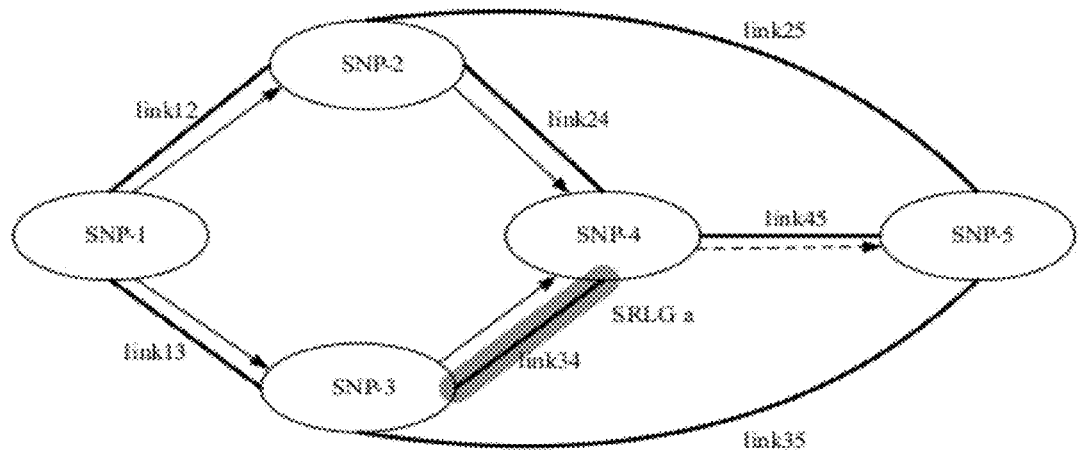
FIG. 5 is the schematic graph of the alternative routes obtained by using the isolation-between-sections strategy of prior art under the must-be-passed-through node SNP-4 constraint of Example 1.

When the existing isolation-between-sections strategy is utilized to perform alternative route computing for the graph of transmission network topology shown in FIG. 3 with the constraining conditions same to those of Example 1, the process comprises the following steps: firstly, with avoiding the destination node SNP-5 as the constraining condition, computing the subroutes from the source node SNP-1 to the node SNP-4 to obtain two lines of subroutes SNP-1→SNP-2→SNP-4 and SNP-1→SNP-3→SNP-4, as shown by the solid arrow in FIG. 5; then, with avoiding the head node SNP-1 and the intermediate nodes SNP-2, SNP-3, which have been passed through by the above two lines of routes, as the constraining condition, computing the subroute from SNP-4 to SNP-5, and obtaining one line of subroute SNP-4→SNP-5, as shown by the dotted arrow in FIG. 5; finally, combining the two sections of the subsegment routes, and obtaining two lines of routes that are from the source node SNP-1 to the destination node SNP-5 and must pass through the node SNP-4, as shown in FIG. 5, wherein the thin solid lines are SNP links and the heavy solid lines are SRLGs, i.e.:
    A1'. SNP-1→SNP-2→SNP-4→SNP-5;
    A2'. SNP-1→SNP-3→SNP-4→SNP-5.

In Example 1, the subroutes from the must-be-passed-through node SNP-4 to the destination node SNP-5 may be computed without avoiding the node SNP-2 and the node SNP-3, and the computed routes of each subsegment are screened and combined to obtain complete routes that are more than those obtained in Comparative Example 1 and satisfy the constraining condition of the must-be-passed-through node SNP-4, so that network topology resources are sufficiently utilized in route computing.

In the method for implementing alternative routes in optical transmission network of WSON of the present invention, under the constraining condition that multiple intermediate links must be passed through to perform the computing of K lines of constrained alternative routes, the managing plane requires that the obtained K lines of alternative routes successively pass through the source node, link12, link34, . . . , and the destination node. In route computing, one embodiment independently and successively distributes query route based on the constraints of must-be-passed-through link12, must-be-passed-through link34, . . . , and obtains K1, K2, lines of subroutes that are corresponding to and satisfy each must-be-passed-through link constraints based on the screening-and-combining strategy. Then, the embodiment integrates to obtain complete K lines of alternative routes by using the screening-and-combining strategy again based on the obtained K1, K2, lines of subroutes. The examples and the comparative examples are as follows:

EXAMPLE 2

FIG. 6 to FIG. 9 show graphs of another transmission network topology, wherein the thin solid lines are SNP links. The managing plane distributes a route enquiry request to require computing the K lines of routes that are from the node SNP-1 to the node SNP-9 and must pass through the link link68. The final routes are ordered according to a certain strategy, which in this example is the ordering strategy with the minimal total link cost, and other strategies may be utilized.

Figure 6:
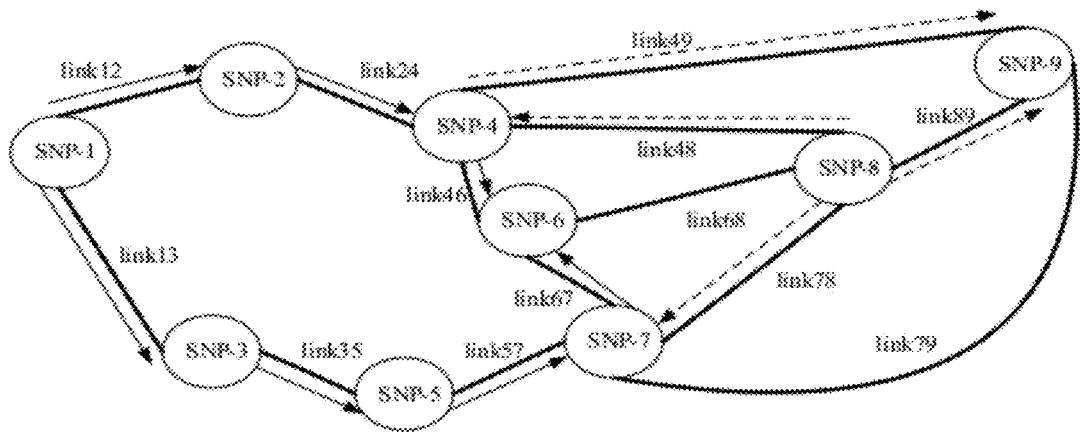
FIG. 6 is the schematic graph of the alternative routes computed by the method of the present invention under the must-be-passed-through link link68 constraint (the direction is from SNP-6 to SNP-8) of Example 2.

Following are the steps to implement the alternative routes.
For the constraint that the designated link link68 must be passed through, it should be considered that the route with the constraint in the route computing is in the direction from SNP6 to SNP8. The steps are: firstly, with avoiding the destination node SNP-9 and the link endpoint SNP8 as the constraining condition, computing the subroutes from the source node SNP-1 to the node SNP-6, and obtaining two lines of subroutes SNP-1→SNP-2→SNP-4→SNP-6 and SNP-1→SNP-3→SNP-5→SNP-7→SNP-6, as shown by the solid arrow in FIG. 6; then, with avoiding the head node SNP-1 and the link endpoint SNP-6 as the constraining condition, computing the subroutes from the link endpoint SNP-8 to the destination node SNP-9, and obtaining three lines of subroutes SNP-8→SNP-4→SNP-9, SNP-8→SNP-7→SNP-9 and SNP-8→SNP-9, as shown by the dotted arrow in FIG. 6; finally, combining the two sections of the subsegment routes, and obtaining four lines of routes that are from the source node SNP-1 to the destination node SNP-9, passing through the link link68 as necessary, in the direction from SNP-6 to SNP-8 and with no repetitive nodes or repetitive links, as shown in FIG. 6, i.e.:

B1. SNP-1→SNP-2→SNP-4→SNP-6→SNP-8→SNP-9;
B2. SNP-1→SNP-3→SNP-5→SNP-7→SNP-6→SNP-8→SNP-9;
B3. SNP-1→SNP-2→SNP-4→SNP-6→SNP-8→SNP-7→SNP-9;
B4. SNP-1→SNP-3→SNP-5→SNP-7→SNP-6→SNP-8→SNP-4→SNP-9.

Figure 7:
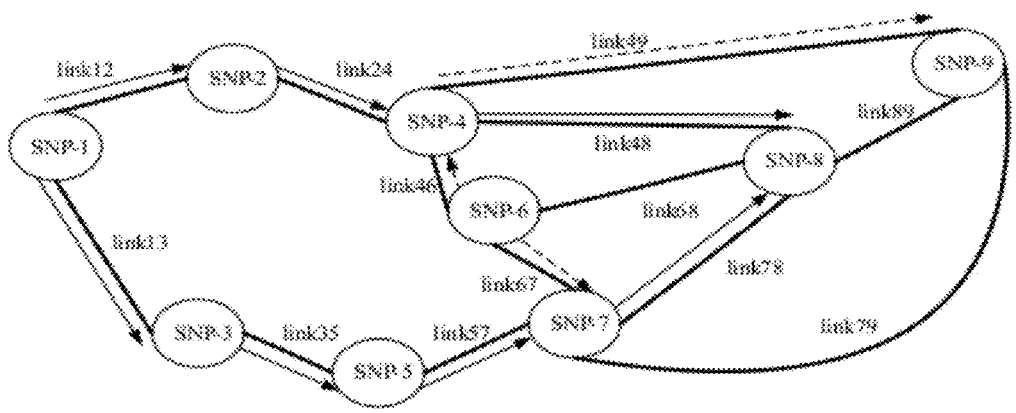
FIG. 7 is the schematic graph of the alternative routes computed using the method of the present invention under the must-be-passed-through link link68 constraint (the direction is from SNP-8 to SNP-6) of Example 2.

Then, it is considered that the route with the constraint that the link link68 must be passed through is in the direction from SNP8 to SNP6. The steps are: firstly, with avoiding the destination node SNP-9 and the link endpoint SNP6 as the constraining condition, computing the subroutes from the source node SNP-1 to the node SNP-8, and obtaining two lines of subroutes SNP-1→SNP-2→SNP-4→SNP-8 and SNP-1→SNP-3→SNP-5→SNP-7→SNP-8, as shown by the solid arrow in FIG. 7; then, with avoiding the head node SNP-1 and the link endpoint SNP-8 as the constraining condition, computing the subroutes from the link endpoint SNP-6 to the destination node SNP-9, and obtaining two lines of subroutes SNP-6→SNP-4→SNP-9, SNP-6→SNP-7→SNP-9, as shown by the dotted arrow in FIG. 7; finally, combining the two sections of the subsegment routes, and obtaining two lines of routes that are from the source node SNP-1 to the destination node SNP-9, passing through the link link68 as necessary, in the direction from SNP-8 to SNP-6 and with no repetitive nodes or repetitive links, as shown in FIG. 7, i.e.:

C1. SNP-1→SNP-2→SNP-4→SNP-8→SNP-6→SNP-7→SNP-9;
C2. SNP-1→SNP-3→SNP-5→SNP-7→SNP-8→SNP-6→SNP-4→SNP-9.

COMPARATIVE EXAMPLE 2

When the existing isolation-between-sections strategy is utilized to perform alternative route computing for the graphs of transmission network topology shown in FIG. 6 to FIG. 9 with the constraining conditions same to those of Example 2, the process comprises the following steps:

for the constraint that the designated link68 must be passed through, it is considered firstly in the route computing that the route with the constraint is in the direction from SNP6 to SNP8. The steps are: firstly, with avoiding the destination node SNP-9 and the link endpoint SNP8 as the constraining condition, computing the subroutes from the source node SNP-1 to the node SNP-6, and obtaining two lines of subroutes SNP-1→SNP-2→SNP-4→SNP-6 and SNP-1→SNP-3→SNP-5→SNP-7→SNP-6, as shown by the solid arrow in FIG. 8; then, with avoiding the head node SNP-1, the intermediate nodes SNP-2, SNP-3, SNP-4, SNP5, SNP-7 and the link endpoint SNP-6, which have been passed through by the above two lines of routes, as the constraining condition, computing the subroute from the link endpoint SNP-8 to the destination node SNP-9, and obtaining one line of subroute SNP-8→SNP-9, as shown by the dotted arrow in FIG. 8; finally, combining the two sections of the subsegment routes, and obtaining two lines of routes that are from the source node SNP-1 to the destination node SNP-9, passing through the link link68 as necessary and in the direction from SNP-6 to SNP-8, as shown in FIG. 8, i.e.:

B1'. SNP-1→SNP-2→SNP-4→SNP-6→SNP-8→SNP-9;
B2'. SNP-1→SNP-3→SNP-5→SNP-7→SNP-6→SNP-8→SNP-9.

Figure 9:
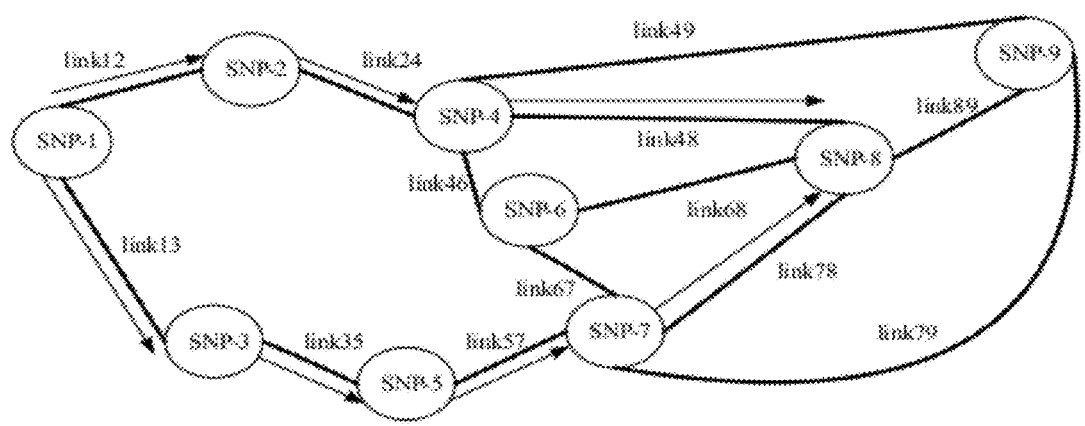
FIG. 9 is the schematic graph of the alternative routes computed by using the isolation-between-sections strategy of the prior art under the must-be-passed-through link link68 constraint (the direction is from SNP-8 to SNP-6) of Example 2.

Then, it is considered that the route with the constraint that the link link68 must be passed through is in the direction from SNP8 to SNP6. The steps are: firstly, with avoiding the destination node SNP-9 and the link endpoint SNP6 as the constraining condition, computing the subroutes from the source node SNP-1 to the node SNP-8, and obtaining two lines of subroutes SNP-1→SNP-2→SNP-4→SNP-8 and SNP-1→SNP-3→SNP-5→SNP-7→SNP-8, as shown by the solid arrow in FIG. 9; then, with avoiding the head node SNP-1, the intermediate nodes SNP-2, SNP-3, SNP-4, SNP5, SNP-7 and the link endpoint SNP-8, which have been passed through by the above two lines of routes, as the constraining condition, computing the subroutes from the link endpoint SNP-6 to the destination node SNP-9, and obtaining zero line of subroute SNP-8→SNP-9; finally, combining the two sections of the subsegment routes, and obtaining zero line of route that is from the source node SNP-1 to the destination node SNP-9, passing through the link link68 as necessary and in the direction of from SNP-8 to SNP-6, as shown in FIG. 9.

Figure 8:
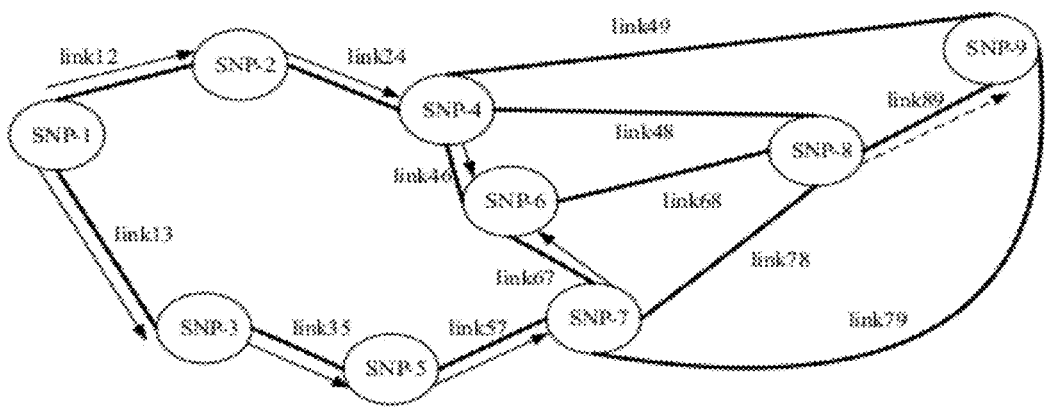
FIG. 8 is the schematic graph of the alternative routes computed by using the isolation-between-sections strategy of the prior art under the must-be-passed-through link link68 constraint (the direction is from SNP-6 to SNP-8) of Example 2.

In conclusion, computed by using the method of isolation-between-sections, there are only two routes that are from SNP1 to SNP9 and must pass through link68, as shown in FIG. 8.

In Example 2, the subroutes in the must-be-passed-through link link68 may also be computed without avoiding the intermediate node SNP-2, node SNP-3, node SNP-4, node SNP-5 and node SNP-7, and the computed subroutes are screened and combined, thereby obtaining complete routes that are more than those obtained in Comparative Example 2 and satisfy the constraining condition of the must-be-passed-through link link68, so that network topology resources are sufficiently utilized in route computing.

The scenario where there are must-be-passed-through SRLGs is similar to that where multiple links are must be passed through, and the processing method is substantially the same to that of Example 2 and will not be described repeatedly.

For the case that the three types of constraints, must-be-passed-through nodes, must-be-passed-through links and must-be-passed-through SRLGs, are combined, the processing methods can be performed in sections according to the way of Example 1 and Example 2, wherein within each subsection or between subsections the above-mentioned screening-combining approach will be applied.

The foregoing content is detailed description of the present invention with reference to specific and preferred embodiments, and it should not be considered that the specific implementation of the present invention is limited thereto. A variety of simple deduction or substitution may be made by those skilled in the art of the present invention without departing form the idea of the present invention and shall be regarded as being fallen into the protection scope thereof.

INDUSTRIAL APPLICABILITY

The method and system for implementing alternative routes in optical transmission network of WSON of the present invention possesses the following advantageous effects over the prior art:

(1) when computing the alternative routes of each subsegment, the present invention satisfies the constraining conditions distributed by the managing plane and in case of multiple subsegments avoids the source nodes and the destination nodes of other subsegments, but does not take any other network resource as the must-be-avoided constraining conditions, which leads to obtaining of more alternative routes and more sufficiently utilize network resource topology than the implementing mode of prior art approaches, which perform isolation between subsegments and take the nodes that have been passed through by the other subsegments as the must-be-avoided constraining conditions;

(2) In the present invention, the computed route of each subsegment are screened and combined, thereby obtaining complete alternative routes, so that no repetitive node and no repetitive link exist within any one of the complete alternative routes.

What is claimed is:

1. A method for implementing alternative routes, comprising:
   distributing, by a managing plane, a constraining condition which comprises must-be-passed-through network resource and Shared Risk Link Group;
   dividing, by a Path Computation Element (PCE) of Wavelength Switched Optical Network (WSON), a to-be-computed complete route from a source node to a destination node into subsegments according to the must-be-passed-through network resource of the constraining condition distributed by a the managing plane; wherein the PCE is a path computing unit of GMPLS (Generalized Multiprotocol Label Switching) and the alternative routing is a function that PCE needs to process under block crossing conditions in WSON;
   computing, by the PCE, alternative sub-routes of each subsegment independently based on the constraining condition distributed by the managing plane; wherein said computing alternative sub-routes of each subsegment comprising: satisfying the constraining condition distributed by the managing plane and when computing alternative sub-routes of a subsegment, taking the source node and the destination node of the complete route as must-be-avoided network resources and taking the must-be-passed-through nodes as must-be-avoided network resources, except that a head node and a tail node of the subsegment are not taken as must-be-avoided network resources, and not taking intermediate nodes that are passed through by the alternative sub-routes of other subsegments as must-be-avoided network resource; and
   after the computation, screening and combining, by the PCE, the computed alternative sub-routes of each subsegment so that no repetitive node and no repetitive link exist within any one of the combined complete alternative routes;
   implementing, by the PCE, alternative routing based on the computed alternative routes;
   wherein said method is applied in an optical transmission network of the WSON for designing appropriate RWA (Routing and Wavelength Assignment) to realize SPC (Soft Permanent Connection).

2. The method as claimed in claim 1, wherein said constraining condition comprises must-be-passed-through network resources and must-be-avoided network resources.

3. The method as claimed in claim 2, wherein said must-be-passed-through network resources comprise must-be-passed-through nodes, must-be-passed-through links and must-be-passed-through shared risk link groups; said must-be-avoided network resources comprise must-be-avoided nodes, must-be-avoided links and must-be-avoided shared risk link groups.

4. A system for implementing alternative routes, wherein the system is comprised in an optical transmission network of Wavelength Switched Optical Network (WSON), and the system comprises a management plane and a Path Computation Element (PCE) of the WSON, wherein
   the PCE is a path computing unit of GMPLS (Generalized Multiprotocol Label Switching) and the alternative routing is a function that PCE needs to process under block crossing conditions in WSON;
   the management plane is configured to distribute a constraining condition which comprises must-be-passed-through network resource and Shared Risk Link Group;
   said PCE comprises an alternative route computing engine and a storage device, wherein the storage device stores software that is executable by the computing engine, and said software comprises a subsegment computing module and a combining module, wherein:
   said subsegment computing module is configured to divide a to-be-computed complete route from a source node to a destination node into subsegments according to must-be-passed-through network resource of a constraining condition distributed by a managing plane, and compute alternative sub-routes of each subsegment independently based on the constraining condition distributed by the managing plane;
   said subsegment computing module is further configured to, during computing the alternative sub-routes of each subsegment, satisfy the constraining condition distributed by the managing plane and when computing alternative sub-routes of a current segment, take the source node and the destination node of the complete route as must-be-avoided network resources and take the must-be-passed-through nodes as must-be-avoided network resources, except that a head node and a tail node of the current subsegment are not taken as must-be-avoided network resources, and not take intermediate nodes that are passed through by the alternative sub-routes of other subsegments as must-be-avoided network resource;
   said combining module is configured to, after the computation by said subsegment computing module, screen and combine the computed alternative sub-routes of each subsegment so that no repetitive node and no repetitive link exist within any one of the combined complete alternative routes;
   the PCE is configured to implement alternative routing based on the computed alternative routes for designing appropriate RWA (Routing and Wavelength Assignment) to realize SPC (Soft Permanent Connection).

5. The system as claimed in claim 4, wherein said constraining condition comprises must-be-passed-through network resources and must-be-avoided network resources.

6. The system as claimed in claim 5, wherein said must-be-passed-through network resources comprise must-be-passed-through nodes, must-be-passed-through links and must-be-passed-through shared risk link groups; said must-be-avoided network resources comprise must-be-avoided nodes, must-be-avoided links and must-be-avoided shared risk link groups.

* * * * *